United States Patent
Moore et al.

(10) Patent No.: US 10,484,270 B2
(45) Date of Patent: Nov. 19, 2019

(54) USER-BASED DIFFERENTIATED ROUTING SYSTEM AND METHOD

(71) Applicant: Level 3 Communications, LLC, Broomfield, CO (US)

(72) Inventors: Richard D. Moore, Frederick, CO (US); Matthew C. Hess, Broomfield, CO (US); Patrick S. Callahan, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 113 days.

(21) Appl. No.: 15/594,182

(22) Filed: May 12, 2017

(65) Prior Publication Data

US 2017/0331729 A1  Nov. 16, 2017

Related U.S. Application Data (60) Provisional application No. 62/339,281, filed on May 20, 2016, provisional application No. 62/336,261, filed on May 13, 2016.

(51) Int. Cl.
| | |
|---|---|
| *H04L 12/725* | (2013.01) |
| *H04L 29/06* | (2006.01) |
| *H04L 29/08* | (2006.01) |
| *H04M 7/12* | (2006.01) |
| *H04Q 3/00* | (2006.01) |

(52) U.S. Cl.
CPC ........ *H04L 45/302* (2013.01); *H04L 65/1006* (2013.01); *H04L 65/80* (2013.01); *H04L 67/18* (2013.01); *H04M 7/1285* (2013.01); *H04Q 3/0025* (2013.01); *H04M 2203/158* (2013.01); *H04Q 2213/13541* (2013.01)

(58) Field of Classification Search
None
See application file for complete search history.

(56) References Cited

U.S. PATENT DOCUMENTS

| | | |
|---|---|---|
| 5,040,171 A | 5/1991 | Osaki |
| 8,520,668 B2 | 8/2013 | Terpstra et al. |
| 2007/0104119 A1 | 5/2007 | Sarkar |
| 2008/0307101 A1 | 12/2008 | Chazin |
| 2012/0321058 A1 | 12/2012 | Eng |

(Continued)

OTHER PUBLICATIONS

International Search Report dated Jul. 26, 2017, Int'l Appl. No. PCT/US17/032482, Int'l Filing Date May 12, 2017; 3 pgs.

(Continued)

*Primary Examiner* — Chi H Pham
*Assistant Examiner* — Raul Rivas (57) ABSTRACT

A differentiated routing system includes an electronic service in communication with an ingress gateway that receives a communication service, such as a call from a terminal, over a trunk. The service receives a request from the ingress gateway for establishing a communication service for the calling party terminal. The service obtains information associated with the calling party terminal, which may be based on the trunk and its relationship to a customer, in which the information is to be used for applying at least one of a routing decision and policy decision to the communication service, and appends a tag to the request based on the information. The service may then transmit the request appended with the information to a routing device, which may then use the information when providing the service.

26 Claims, 6 Drawing Sheets

(56) References Cited

U.S. PATENT DOCUMENTS

2015/0230149 A1    8/2015   Callahan et al.
2015/0263899 A1    9/2015   Tubaltsev
2015/0334026 A1   11/2015   Hadavi et al.
2017/0332154 A1   11/2017   Moore et al.

OTHER PUBLICATIONS

Written Opinion of the International Searching Authority dated Jul. 26, 2017, Int'l Appl. No. PCT/US17/032482, Int'l Filing Date May 12, 2017; 7 pgs.

International Preliminary Report on Patentability, dated Nov. 13, 2018, Int'l Appl. No. PCT/US17/032482, Int'l Filing Date May 12, 2017; 9 pgs.

USER-BASED DIFFERENTIATED ROUTING SYSTEM AND METHOD

CROSS REFERENCE TO RELATED APPLICATIONS

This application is related to and claims priority under 35 U.S.C. § 119 to U.S. Patent Application No. 62/339,281, filed May 20, 2016 entitled "USER-BASED DIFFERENTIATED ROUTING SYSTEM AND METHOD," and U.S. Patent Application No. 62/336,261, filed May 13, 2016 entitled "SUBSCRIBERLESS DIFFERENTIATED ROUTING SYSTEM AND METHOD," both of which are hereby incorporated by reference in their entirety.

TECHNICAL FIELD

Aspects of the present disclosure relate to communication networks and, in particular, to a differentiated routing system and method of operating the same.

BACKGROUND

Communication service providers (CSPs) generally refer to those companies that provide telecommunication services, such as voice and data communications access. Whereas telecommunication services have been traditionally provided by relatively few companies, multiple communication service providers now typically operate to provide these services in any given region. In many cases, the growth in the number of communication service providers has created a favorable environment in which multiple communication service providers may compete for market share with ever-increasing goods and services to be provided for their customers.

SUMMARY

According to one aspect, a differentiated routing system includes a computer-executable differentiated routing service in communication with an ingress gateway that provides a communication service for a calling party terminal in a native network domain. The native network domain includes multiple egress gateways that route the communication services to a corresponding multiple destination network domains. The service receives a request from the ingress gateway for establishing a communication service for the calling party terminal. The service obtains information associated with the calling party terminal in which the information is to be used for applying at least one of a routing decision and policy decision to the communication service, and appends a tag to the request in which the tag including at least a portion of the information. The service may then transmit the appended request appended with the information to a routing device. The tag providing information for instructing the routing device to select one of the destination network domains according to the information included in the request.

DETAILED DESCRIPTION

Embodiments of the present disclosure provide a differentiated routing system that establishes communication services between certain domains and/or at varying levels of service based upon information included in a request for those communication services. Whereas traditional communication services have had limited ability to differentiate how calls are routed when details of the caller are not known, such as when no service level agreement associated with the calling party is available, embodiments of the present disclosure provide a technique of discovering information about the calling party and/or the called party to establish a communication service that may be routed to a proper destination network domain and in some cases, may be customized so that the communication service may be provided at a sufficient service level in a relatively efficient manner, among other advantages. Routing of the communication may be differentiated by a tag included in a request for the communication service such that an egress gateway may be selected that provides a desired type and level of service.

Each communication service provider may operate multiple domains to provide communication services to their subscribers. Although management of communication services may appear to be easier using a single domain, this configuration is not feasible when operating a large network. For example, operation of communication networks that cross international boundaries may be difficult to implement given the differing regulations that are required to be applied in each jurisdiction. Moreover, communication domains operating in one particular region may be constrained to providing different levels of service from what is normally provided when handling communication services from other regional boundaries in which destination domains impose regulations and/or restrictions not required in another domain. Accordingly, segregating communication services according to each national boundary provides an efficient manner of managing communication networks. Additionally, subscribers often have communication needs that differ from one another. For example, some subscribers may desire communication services at cost effective prices, other subscribers may require a relatively higher level of service.

To resolve these issues, communication service providers typically operate multiple network domains in which communication services between these domains are provided by bridge ports that generally function as gateways that provide communication between network domains. Bridge ports may also provide a technique for selecting one from among several different domains to handle the routes, but they are generally not scalable when used in large networks operating with multiple domains and with subscribers whose expected levels of service may change on an ongoing basis. Within the context of the present disclosure, the term "scalable" means an attribute of a network that represents an ability of the network to grow in size while continuing to provide its intended functionality, which pertaining to the statement above, is the ability to use bridge ports for segregating routes while growing the size of the system. For example, to provide routing of differing types and levels of communication services, a separate bridge port for each type and level of communication service would be required, which would be cumbersome when used with multiple number of large network domains. For example, one bridge port would be required for each of a voice service, a short messaging service (SMS), or a multi-media service (MMS) in each domain that the system is implemented in. Also, additional bridge ports for each service type may be necessary based upon varying Quality of Service (QoS) or class of service (CoS) performance levels for each service type.

Figure 1A:
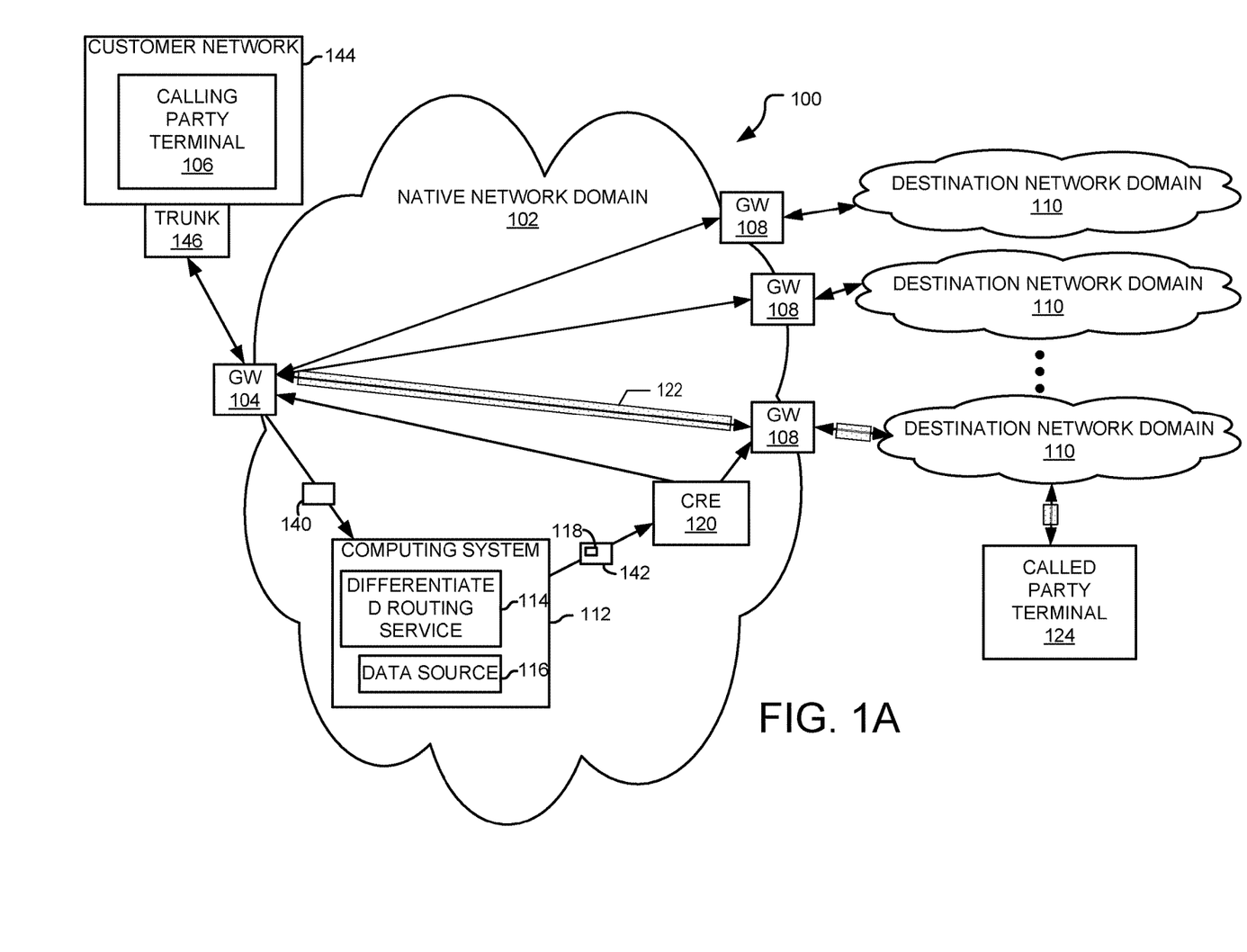
FIG. 1A is a block diagram of an example differentiated routing system according to one aspect of the present disclosure.

FIG. 1A illustrates an example differentiated routing system 100 according to one embodiment of the present disclosure. The system 100 includes a native network domain 102 that includes an ingress gateway 104 for providing a communication service 122 for a calling party terminal 106 and multiple egress gateways 108 for access to communication services provided by one or more other destination network domains 110. The system 100 also includes a computing system 112 or other computing device having a differentiated routing service 114 and a data source 116. According to the teachings of the present disclosure, the computing system 112 executes the differentiated routing service 114 that, when a request 140 for a communication service is received from the ingress gateway 104, appends a tag 118 to the request. The service 114 obtains information about a calling party terminal 106 and/or a trunk 146 associated with a customer network 144, and includes at least a portion of information in the tag 118. The information is used for applying a routing decision and/or a policy decision to the communication service. The service 114 may then transmit the appended request 142 to a routing device, such as a core routing engine (CRE) 120. The tag 118 provides information for instructing the routing device (e.g., CRE 120) to select one of the destination network domains 110 according to the information included in the request.

In general, the tag 118 includes one or more elements of information that is generated by the service 114 and transmitted to the CRE 120 for differentiating routing and/or policies to be applied to the communication service 122. The tag 118 supplements calling and receiving with geographic, service level, and service type, and/or quality information to differentiate routing through a domain and to a domain based on attributes for a customer network 144 and/or a calling party terminal 106 couple to the native network domain 102 through the customer network 144.

In one embodiment, the native network domain 102 comprises a data-based communication network, such as an internet protocol (IP) domain that provides communication services via a data network. For example, the native network domain 102 may provide voice communication services via a voice over IP (VoIP) protocol, data communication services via a transfer control protocol/Internet protocol (TCP/IP), a short messaging services (SMS) protocol, and/or a multimedia messaging service (MMS) protocol. In a particular example in which the communication service 122 is provided as a session, the tag 118 transmitted between the native network domain 102 and destination network domain 110 may be included in a domain portion of a session initiation protocol (SIP) message.

In many cases, a communication service provider, such as an administrator of the native network domain 102, provides communication services to devices of its customers according to previously established service level agreements. Examples of such scenarios include one in which the administrator of the native network domain 102 has been contracted to supply wholesale communication services to a customer having some associated group of terminals, such as a group of terminals administered by an enterprise (e.g., a corporation, a university, etc.). In such a case, the differentiated routing service 114 may, upon receipt of the request 140 for a communication service, determine a trunk 146 or other originating mechanism that received the request 140 from the ingress gateway 104, determine or other information assigned to the trunk 146, and generate the tag 118 to route the communication service 122 based upon parameters (e.g., SLA) for the customer generally and/or a particular terminal associated with the customer receiving the communication. However, scenarios exist where the native network domain 102 may handle communication services for terminals where no service level agreement for that specific terminal is available.

In one embodiment, the differentiated routing service 114 may assign one or more policy levels to the communication service 122 based upon the contractual agreement to supply the wholesale communication services. For example, the administrator of the native network domain 102 may assign a particular quality of service (QoS) level and/or a class of service (CoS) level to communication services provided to the terminals of that wholesale service. Additionally, the contractual agreement may include one or more available service types (e.g., voice services, data services, short messaging services (SMS), multimedia messaging services (MMS), or any combination thereof that are to be provided. When a request 140 is received, the differentiated routing service 114 may ensure that the communication service 122 is established at the agreed upon levels included in the contractual agreement with that enterprise.

In general, the differentiated routing service 114 may be executed to generate a tag 118 to be used by the CRE 120 for instructing the ingress gateway 104 to establish the communication service 122 according to one or more elements of information included in the request 140. The information may include at least a portion of the calling party terminal phone number, the called party terminal phone number. Additionally, the information may include information associated with a trunk 146 that originated the request 140 to the ingress gateway 104. Additional information associated with how the differentiated routing service 114 generates the tag 118 will be described in detail herein below.

The calling party terminal phone number and/or the called party terminal phone number may include information useful for routing the communication service 122 to one of multiple destination network domains 110. For example, the calling party terminal 106 may include an area code or other unique coded sequence (e.g., a '+' indicating a foreign based call) that uniquely identifies the calling party terminal's destination network domain 110. The differentiated routing service 114, using the calling party terminal phone number and/or the called party terminal phone number, may determine a particular destination network domain 110, and generate a tag 118 that instructs the ingress gateway 104 to establish the communication service to the determined destination network domain 110. For example, because phone numbers typically have an area code portion that is associated with a particular geographical region, the service 114 may access area code information included in the phone number to derive geographical information to be included in the tag 118.

The destination network domain 110 may be any suitable type. For example, the destination network domain 110 may be one associated with a particular geographical region, such as a country, a local access and transport area (LATA), or one associated with an enterprise or other entity that has entered into a contractual relationship with the administrator of the native network domain 102 at a wholesale level. The domain of a country may be useful for differentiating services according to a native country of the calling party terminal 106. For example, certain services, such as emergency services (e.g., 911), directory assistance (e.g., 411), and road conditions (e.g., 511) may be provided as voice information in a language native to its country. Therefore, by differentiating the communication services based upon the native country may enable receiving those services for each subscriber in their native language.

The calling party terminal 106 and/or called party terminal 124 may be a device that is to receive data and/or communications from, and/or transmit data and/or communications to, the native network domain 102, or other destination network domains 110. For example, the calling party terminal 106 and/or called party terminal 124 can be a wireless telephone, a landline telephone, or any suitable computing device, such as a personal computer, such as a laptop or notebook computer, a workstation, or other processing device such as a smart phone or a tablet computer.

When a request 140 for a communication service is to be routed to a destination network domain 110, the tag may be transmitted along with the communication service 122 so that the type and level of service may be maintained as it is routed through the destination network domain 110. The destination network domain 110 may be any type that is external to the native network domain 102. The ingress gateway 104 and egress gateway 108, calling party terminal 106, and called party terminal 124 each has one or more processors and executable instructions stored in volatile and/or non-volatile memory for performing the actions and/or steps described herein.

Figure 1B:
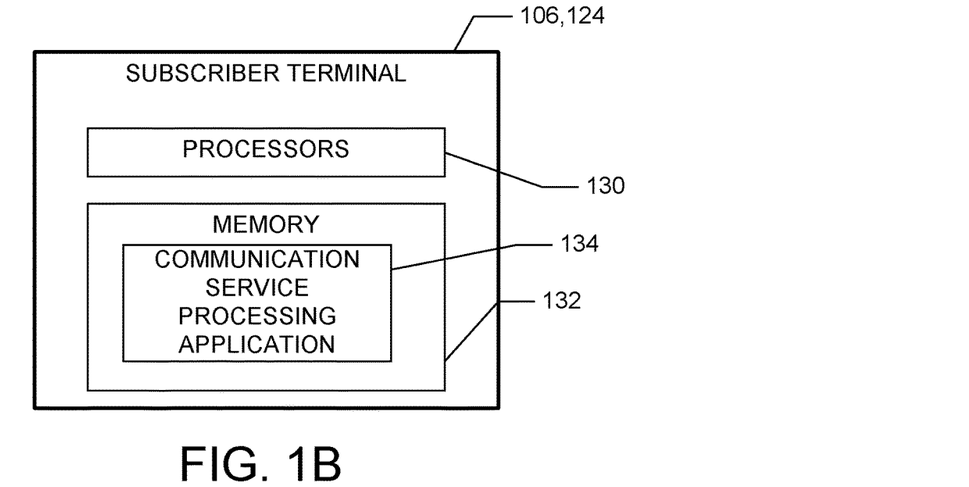
FIG. 1B depicts an example subscriber terminal that may be used by the differentiated routing system according to one aspect of the present disclosure.
Figure 1C:
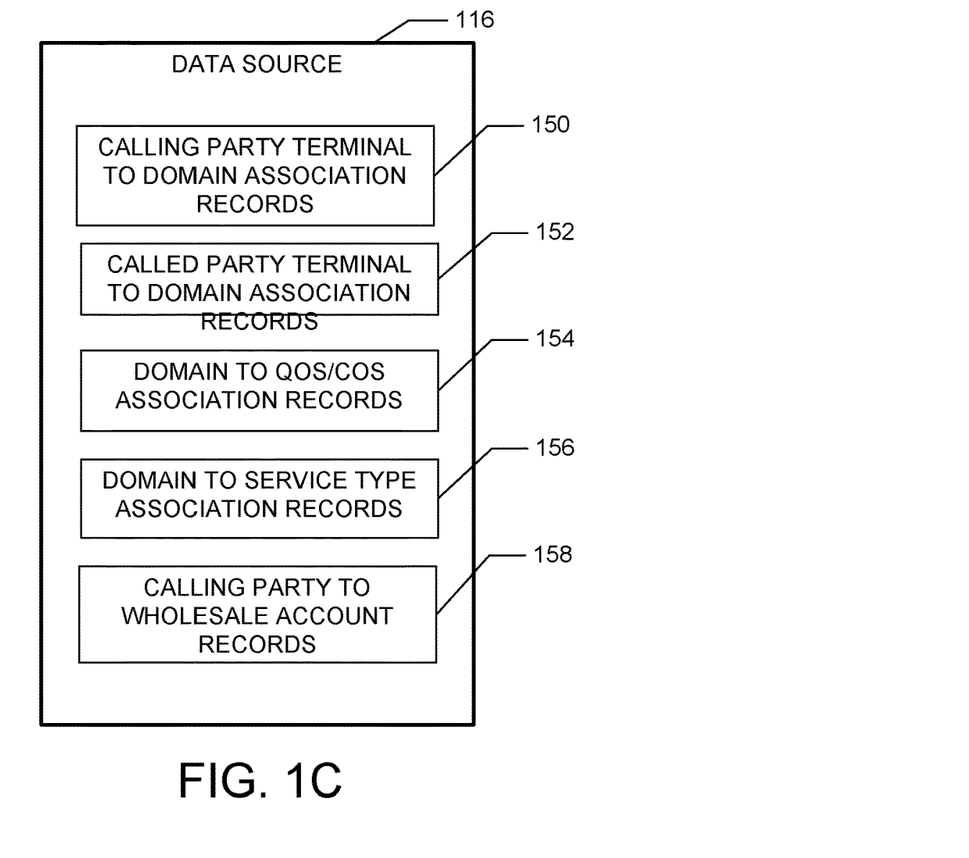
FIG. 1C depicts an example data source that may be used by the differentiated routing system according to one aspect of the present disclosure.

As best shown in FIG. 1C, the data source 116 stores calling party terminal to domain association records 150, called party terminal domain association records 152, domain to QoS/CoS association records 154, and domain to service type association records 156. The calling party terminal domain association records 150 store information associated with a particular domain that the calling party terminal 106 may belong. For example, the calling party terminal domain association records 150 may associate a particular sequence (e.g., an area code) of a portion of the calling party's phone number to a particular domain, such as a country where the calling party terminal may reside. Likewise, the called party terminal domain association records 152 store information associated with a particular domain that the called party terminal 124 may belong. The destination domain to QoS/CoS association records 154 stores information associated with a particular QoS and/or CoS that the destination network domains 110 may use, while the domain to service type association records 156 may store information associated with one or more particular service types that the destination network domains 110 may use.

FIG. 1B illustrates an example calling party terminal 106, 124 according to one embodiment of the present disclosure.

The calling party terminal 106, 124 is a computing or processing device that includes one or more processors 130 and memory 132 and is to receive data and/or communications from, and/or transmit data and/or communications to, the computing system 112 via the native network domain 102. For example, the calling party terminal 106, 124 can be a wireless telephone, a landline telephone, or any suitable computing device, such as a personal computer, such as a laptop or notebook computer, a workstation, or other processing device such as a smart phone or a tablet computer. The memory stores a communication service processing application 134 that establishes one or more communication services using the core routing engine 120, such as requesting a communication service (e.g., call setup), voice and/or data transmission between the calling party terminal 106, 124 and the core routing engine 120.

Figure 2:
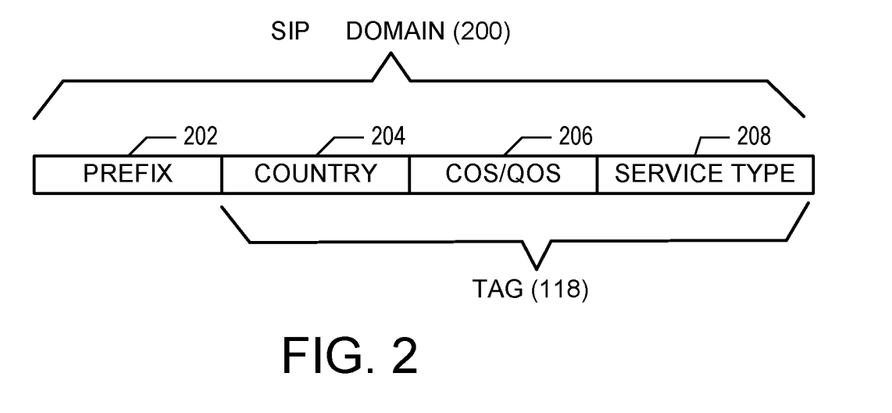
FIG. 2 illustrates an example tag that may be appended to a session initiation protocol (SIP) domain according to one aspect of the present disclosure.

FIG. 2 illustrates an example tag 118 that may be generated by the differentiated routing service 114 according to one embodiment of the present disclosure. As shown, the tag defines information that is appended to a prefix portion 202 of a SIP domain 200. Nevertheless, it should be appreciated that the tag 118 may be any suitable type that conveys service level agreement information or other service level and/or quality information to the CRE 120 for establishing the communication session 122 according to one or more elements of the service level agreement. The Session Initiation Protocol (SIP) is the signaling protocol selected by the 3rd Generation Partnership Project (3GPP) to create and control multimedia sessions with two or more participants in the IP Multimedia Subsystem (IMS).

More specifically and in one example, the tag includes three portions, a country designation portion 204, a CoS/QoS portion 206, and a service type portion 208. The country designation portion 204 includes information associated with a country, such as the country from which the communication originated, to be associated with the calling party terminal 106. The CoS/QoS portion 206 includes information associated with a particular class of service and/or quality of service to be used for the communication session 122. The service type portion 208 includes information associated with one or more service types to be provided for the calling party terminal 106. For example, if a communication service 122 is to be established within the country of Great Brittain (GBR) using a premium level of service (PREM) using a particular service type of IEVEL3_SEVICELEVELTYPE1', a tag 118 such as 'GBR.PREM.LEVEL3_SERVICELEVELTYPE1.NET' could be generated to convey this information to the CRE 120 for routing the communication service 122 and setting appropriate policies for the communication service 122.

Although a country designation portion 204, a CoS/QoS portion 206, and a service type portion 208 is described herein, it should be understood that other embodiments of the tag may include additional, fewer, or different portions than are described herein without departing from the spirit and scope of the present disclosure. For example, the differentiated routing service 114 may not include a CoS/QoS portion 206 or the service type portion 208 for various reasons, such as lack of CoS/QoS or service type information known about the destination network domain 110. That is, the differentiated routing service 114 may only include CoS/QoS information or service type information when the differentiated routing service 114 has specific information associated with the determined destination network domain 110 to which the communication service 122 is directed, such as what is to be stored in the domain to QoS/CoS association records 154 or the domain to service type association records 156.

Figure 3:
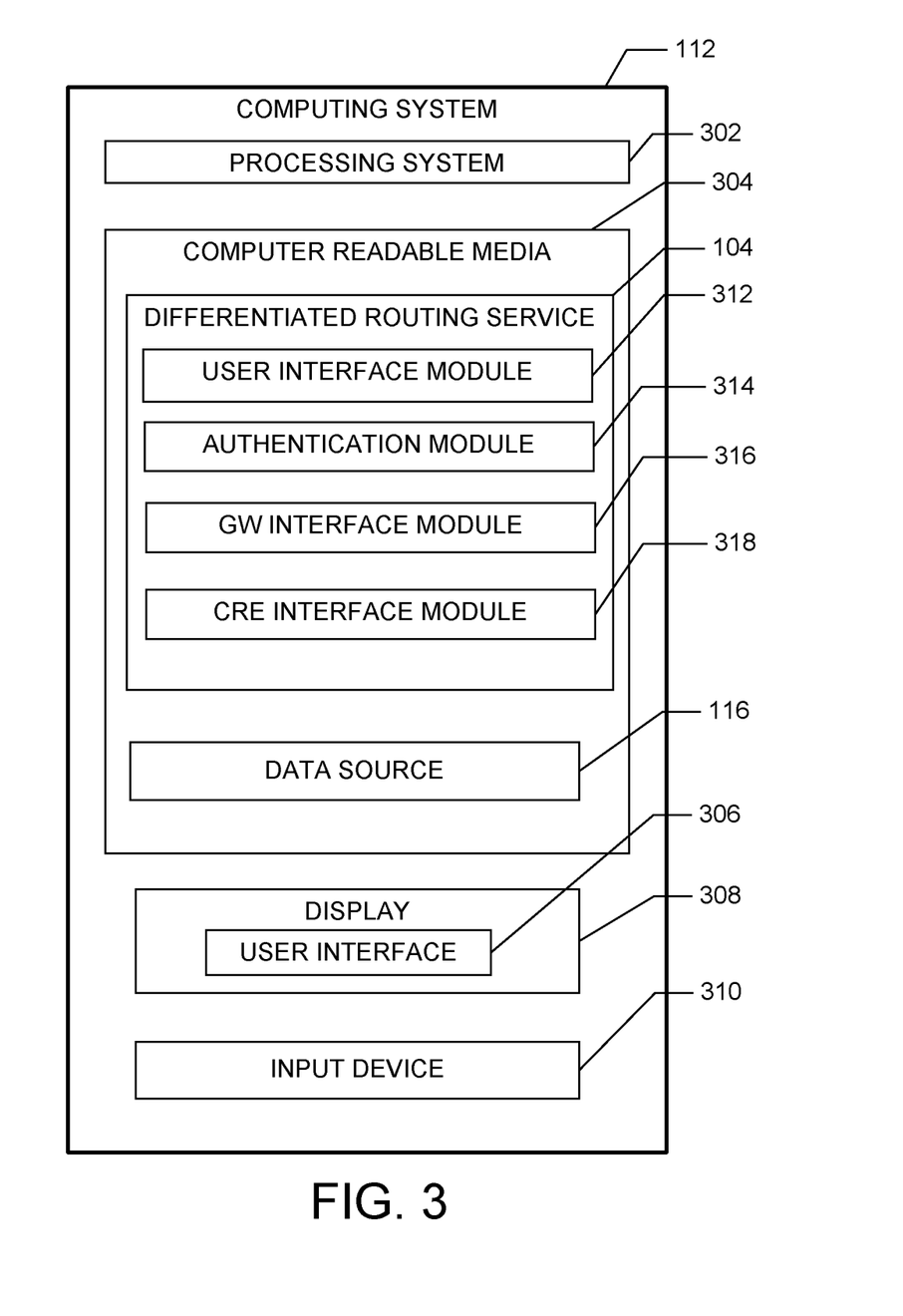
FIG. 3 is a block diagram depicting an example differentiated routing service executed on the computing device according to one embodiment of the present disclosure.

FIG. 3 is a block diagram depicting an example differentiated routing service 114 executed on the computing system 112 according to one embodiment of the present disclosure. The computing system 112 includes a processing system 302 that includes one or more processors or other processing devices. A processor is hardware. Examples of such a computing device include one or more servers, personal computers, mobile computers and/or other mobile devices, and other computing devices. The computing system 102 may communicate with the ingress gateway 104, the egress gateways 108, and/or the CRE 120 via wireless, wired, and/or optical communications.

According to one aspect, the computing system 102 includes a tangible and non-transitory computer readable media 304 on which the service 104, in the form of computer executable instructions, and data source 116 are stored. The differentiated routing service 114 includes instructions or modules that are executable by the processing system 302 to perform the features of the differentiated routing system 100 described herein. The computer readable media 304 may include volatile media, nonvolatile media, removable media, non-removable media, and/or another available media that can be accessed by the computing system 112.

According to one aspect, the computing system 102 may include a user interface 306 displayed on a display 308, such as a computer monitor, for displaying data. The computing system 112 may also include an input device 310, such as a keyboard or a pointing device (e.g., a mouse, trackball, pen, or touch screen) to enter data into or interact with the user interface 306. It is also possible that the computing system 102 may not include a user interface or display.

A user interface module 312 facilitates the receipt of input data and/or output data from or to a user (e.g., an administrator of the computing system 112), respectively, for manipulating the operation of the system 100. In one example, the user interface module 312 may receive user input for manipulating or otherwise modifying how communication services are to be provided for each terminal 104 and 108 or for certain types of terminals that use the system 100. For example, the user interface module 312 may interact with the user to receive information for diagnosing problems that may occasionally arise with the operation of the system 100. As another example, the user interface module 312 may interact with a user, such as an administrator, for obtaining calling party terminal to domain association records 150, called party terminal domain association records 152, domain to QoS/CoS association records 154, and domain to service type association records 156 to be used by the differentiated routing system 100. The differentiated routing service 114, however, may normally operate without user input.

An authentication module 314 authenticates the calling party terminal 106 for use with system 100. In general, the authentication module 314 ensures that the calling party terminal 106 is allowed to use the differentiated routing service 114, and if so, processes information provided about the calling party terminal 106 to establish the communication service for the calling party terminal 106. For example, when a user associated with the calling party terminal 106 has an established account with the service provider managing the system 100, the authentication module 314 may access account information associated with the calling party terminal 106 to determine what type and level of communication services to be provided for the calling party terminal 106. In some cases, the authentication module 314 may search the calling party to wholesale account records 158 to determine whether the calling party terminal 106 has an account with a wholesale SLA; and if so, determine what type and level of communication services may be provided for the calling party terminal 106 that is associated with that wholesale SLA.

In general, a service level agreement (SLA) is a contractual agreement that is established between a communication service provider (CSP) the native network domain 102 and a customer that uses the native network domain 102. The contractual agreement between the CSP and the customer of the communication network specifies what services are to be provided and any performance levels associated with these services. For example, the CSP may offer multiple service plans that each provides differing combinations and levels of communication services, such as voice communication services, video communication services, and/or data communication services, such as short messaging services (SMS), multimedia messaging services (MMS), and the like. Additionally, the service plans offered by the CSP may specify varying performance levels associated with each communication service, such as quality of service (QoS) levels, grade of service (GoS) levels, and/or terms of service (ToS) levels. For example, the service level agreement may include information about a minimum and/or guaranteed level of throughput to be maintained by the communication path, and a maximum level of burstiness to be exhibited by the communication path. Thus, the performance characteristics and their associated value may be tailored for each customer to ensure that the agreed upon service level agreement is met. A wholesale SLA is a particular type of SLA that is established for a group of customers, such as the members of an organization.

A gateway interface module 316 communicates with an ingress gateway 104 to obtain information for establishing a communication service for the calling party terminal 106, deleting the communication service at the completion of the communication service, and/or providing information to the user of the ingress gateway 104. For example, the ingress gateway interface module 316 may manage receipt of a request message 140 from the ingress gateway 104 requesting a new communication service 122.

A CRE interface module 318 communicates with the CRE 120 in the native network domain 102 to transmit an appended message 142 that includes a tag 118 so that the CRE 120 may establish the communication service 122 using information included in the tag 118. In one embodiment, the information may include country information associated with a country, such as the country from which the communication originated, CoS/QoS information associated with a particular class of service and/or quality of service to be used for the communication session 122, and service type information associated with one or more service types to be provided for the calling party terminal 106.

Once the CRE 120 receives the message, it processes the information in the tag 118 to select one destination network domain 110 from among multiple available destination network domains 110 for handling the communication service 122 for the calling party terminal 106. For example, the CRE 120 may determine if one of the destination network domains 110 is a native (e.g., home) domain for the calling party terminal 106; and if so, select that destination network domain 110 for handling the communication session 122. As another example, the CRE 120 may identify a particular domain that most closely matches the QoS/cos parameters assigned to the calling party terminal 106, and thereafter, select that destination network domain 110 for handling the communication session. As yet another example, the CRE 120 select that destination network domain 110 related to the called party terminal 124. As yet another example, the CRE 120 select a particular destination network domain 110 having the capability of providing a particular service type for the calling party terminal 106.

It should be appreciated that the modules described herein are provided only as an example of a computing device that may execute the differentiated routing differentiated routing service 114 according to the teachings of the present disclosure, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as the PE device configured in the VLAN 108.

Figure 4:
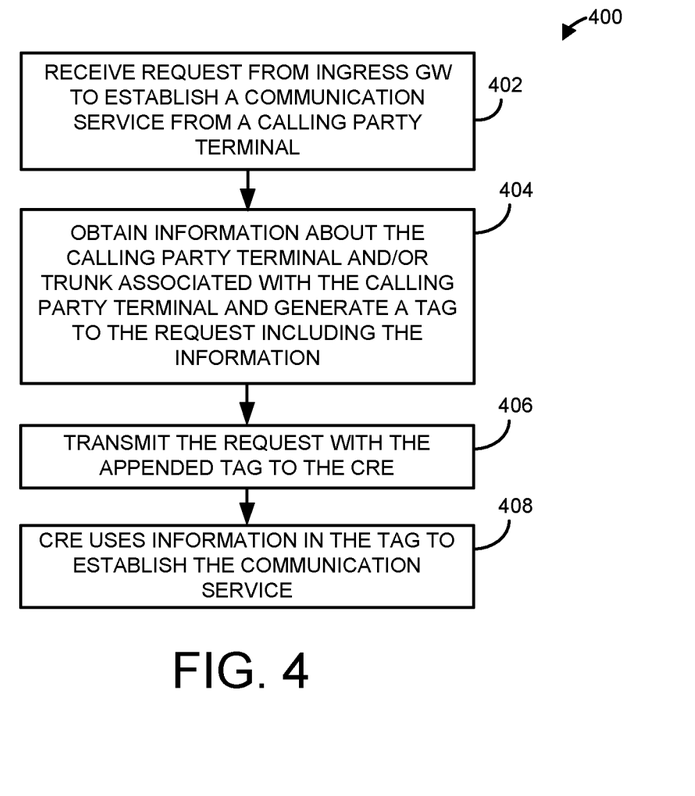
FIG. 4 illustrates an example process that may be performed by the differentiated routing service according to one embodiment of the present disclosure.

FIG. 4 illustrates an example process that may be performed by the system 100 to provide a communication service 122 for a calling party terminal 106 according to one embodiment of the present disclosure. Initially, the subscriber associated with the calling party terminal 106 has either established a SLA with the administrator of the system 100, and/or is included in a wholesale SLA associated with multiple calling parties of an organization, such as a university, a corporation, or the like.

At step 402, the differentiated routing service 114 receives a request 140 from an ingress gateway 104 for establishing a communication service for the calling party terminal 106 of the subscriber. At step 404, the differentiated routing service 114 then obtains information about the calling party terminal 106 and/or the trunk 146 associated with the customer network 144 and generates a tag 118 based upon the obtained information. The information is to be used for applying at least one of a routing decision and policy decision to the communication service. In general, the ingress gateway 104 will be dedicated to a particular trunk 146 of the customer network 144. Thus, the service 114 may compare the identity of ingress gateway 104 that issued the request to obtain a unique identity of the customer network 144. The service 114 may obtain information about the trunk 146 of the customer network 144 and/or the calling party terminal 106 in any suitable manner. For example, the service 114 may access the information stored in the data source 116 to obtain information, such as whether one of the destination network domains 110 is a native (e.g., home) domain for the calling party terminal 106, whether a particular destination domain is closely matched the QoS/cos parameters assigned to the calling party terminal 106, and whether a destination network domain 110 related to the called party terminal 124.

Thereafter at step 406, the service 120 transmits the request along with the appended tag 118 to the CRE 120. The tag 118 may include any suitable information that can be used by the CRE 118 for differentiating the communication service 122 according to information known about the calling party terminal 106. For example, the information may include country information associated with a country, such as the country from which the communication originated, CoS/QoS information associated with a particular class of service and/or quality of service to be used for the communication session 122, and service type information associated with one or more service types to be provided for the calling party terminal 106. In other embodiments, the information may include that obtained about whether a SLA exists for the calling party terminal 106, whether the calling party associated with the calling party terminal 106 is under a wholesale SLA, whether a destination network domain 110 is a home domain of the calling party terminal 106, and/or whether the called party terminal 124 is associated with a particular destination network domain 110.

At step 408, the CRE 120 uses information included in the tag 118 to establish the communication service 122. The CRE 120 may use the information included in the tag 118 to establish the communication service 122 according to information included in the tag 118. That is, the CRE 120 may use the information for applying one or more routing decisions and/or one or more policy decisions for establishing the communication service. For example, the CRE 120 may process information associated with one or more performance parameters included in the tag 118 to select the destination network 110. As another example, the CRE 120 may process information associated with a geographical location of the called party terminal included in the tag 118 to select the destination network 110. As yet another example, the CRE 120 may process information associated with one or more performance parameters included in the tag 118 to select the destination network 110. As yet another example, the CRE 120 may identify the service level agreement (SLA) associated with the calling party terminal, and access a database store to obtain the performance parameters included in the service level agreement to select the destination network 110. As yet another example, the CRE 120 inspects the tag 118 and relates it to a specific set of features assigned to a virtual trunk group provisioned in the CRE 120.

The process described above continues throughout operation of the system 100 for establishing other additional communication services for the same calling party terminal 106 to a called party terminal 124 through an external destination network domain 110. Nevertheless, when use of the dynamic services provisioning portal 104 is no longer needed or desired the process ends.

It should be appreciated that the process described herein is provided only as an example and that the differentiated routing service 114 may execute additional steps, fewer steps, or differing steps than those described herein. For example, the steps 402 through 428 may be executed in any suitable order; that is, the steps as described in FIG. 4 are not limited to execution in any particular sequence. As another example, either of the steps 402 through 428 described herein may be executed by another computing device, such as by the CRE 120 or other node in communication with the native network domain 102 without departing from the spirit or scope of the present disclosure.

Figure 5:
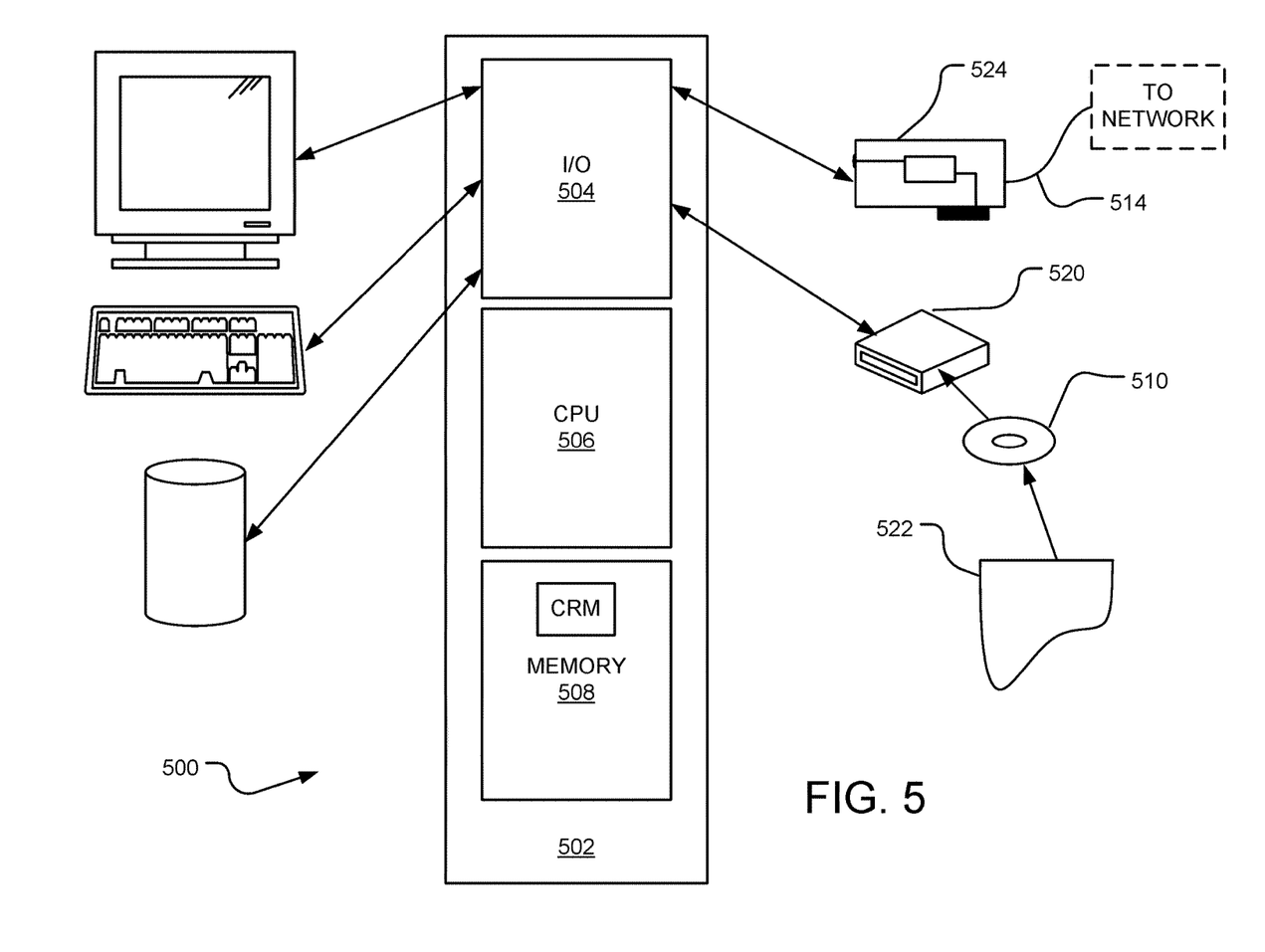
FIG. 5 illustrates an example of a computing system that may implement various systems and methods discussed herein.

FIG. 5 illustrates an example computing system 500 that may implement various systems discussed herein. A general purpose computer system 500 is capable of executing a computer program product to execute a computer process. Data and program files may be input to the computer system 500, which reads the files and executes the programs therein such as the differentiated routing service 114. Some of the elements of a general purpose computer system 500 are shown in FIG. 5 wherein a processing system 502 is shown having an input/output (I/O) section 504, a hardware central processing unit (CPU) 506, and a memory section 508. The processing system 502 of the computer system 500 may have a single hardware central-processing unit 506 or a plurality of hardware processing units. The computer system 500 may be a conventional computer, a server, a distributed computer, or any other type of computing device, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 514, thereby transforming the computer system 500 in FIG. 5 to a special purpose machine for implementing the described operations.

The memory section 508 may be volatile media, nonvolatile media, removable media, non-removable media, and/or other hardware media or hardware mediums that can be accessed by a general purpose or special purpose computing device. For example, the memory section 508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 504 is connected to one or more optional user-interface devices (e.g., a user interface such as a keyboard 516 or the user interface 512), an optional disc storage unit 512, an optional display 518, and an optional disc drive unit 520. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 508, on a disc storage unit 512, on the DVD/CD-ROM medium 510 of the computer system 500, or on external storage devices made available via a cloud computing architecture with such computer program products, including one or more database management products, web server products, differentiated routing service products, and/or other additional software components. Alternatively, a disc drive unit 520 may be replaced or supplemented by a tape drive unit, or other storage medium drive unit. An optional network adapter 524 is capable of connecting the computer system 500 to a network via the network link 514, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as mobile phones, tablets or slates, multimedia consoles, gaming consoles, set top boxes, etc.

When used in a LAN-networking environment, the computer system 500 is connected (by wired connection and/or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

Some or all of the operations described herein may be performed by the processing system 502, which is hardware. Further, local computing systems, remote data sources and/or services, and other associated logic represent firmware, hardware, and/or software configured to control operations the system 100 and/or other components. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A differentiated routing system comprising:
a computing system in communication with an ingress gateway that provides a communication service for a calling party terminal in a native network domain, the native network domain comprising a plurality of egress gateways that route the communication services to a corresponding plurality of destination network domains, the computing system comprising a processor and a memory to store instructions that are executed by the processor to:
receive a request from the ingress gateway for establishing a communication service for the calling party terminal;
obtain information related to the calling party terminal, wherein the information is used for applying at least one of a routing decision and a policy decision to the communication service, and further wherein the information is indicative of at least one of a country designation portion, a quality of service, a class of service portion, and a service type portion;
append a tag to the request, wherein the tag includes the at least one of a country designation portion, a quality of service, a class of service portion, and a service type portion, wherein the at least one of a country designation portion, a quality of service, a class of service portion, and a service type portion is derived from the information; and
transmit the request appended with tag to a routing device, wherein the tag is used for instructing the routing device to select one of the destination network domains according to the at least one of a country designation portion, a quality of service, a class of service portion, and a service type portion is derived from the information.

2. The differentiated routing system of claim 1, wherein the information comprises geographical information the geographical information used by the routing device to select the destination network domain according to a geographical region where the calling party terminal resides by processing a phone number of the calling party terminal.

3. The differentiated routing system of claim 1, wherein the information comprises one or more performance parameters, the one or more performance parameters used by the routing device to select the destination network domain according to the one or more performance parameters for the communication service.

4. The differentiated routing system of claim 3, wherein the instructions are further executed to:
identify a service level agreement (SLA) associated with the calling party terminal; and
access a database store to obtain the one or more performance parameters included in the SLA.

5. The differentiated routing system of claim 1, wherein the instructions are further executed to identify the ingress gateway that issued the request, determine a trunk of a particular customer that is dedicated for use with the ingress gateway, identify a service level agreement (SLA) that is associated with the trunk, access a database store to obtain the one or more performance parameters included in the SLA, and include the one or more performance parameters of the SLA in the tag.

6. The differentiated routing system of claim 1, wherein the tag comprises a session initiation protocol (SIP) domain portion of a SIP message.

7. The differentiated routing system of claim 6, wherein the information comprises type of service information, the type of service information used by the routing device to select at least one of the destination network domains that provides a type of service associated with the type of service information.

8. A differentiated routing method comprising:
receiving, using instructions stored on a computer-readable medium and executed by a processor, a request from an ingress gateway for establishing a communication service for a calling party terminal, wherein the ingress gateway provides communication services for the calling party terminal in a native network domain, the native network domain comprising a plurality of egress gateways that route the communication services to a corresponding plurality of destination network domains;
obtaining, using instructions executed by the processor, information associated with the calling party terminal, the information used for applying at least one of a routing decision and policy decision to the communication service, and further wherein the information is indicative of at least one of a country designation portion, a quality of service, a class of service portion, and a service type portion;
appending, using the instructions executed by the processor, a tag to the request, wherein the tag includes the at least one of a country designation portion, a quality of service/class of service portion, and a service type portion, wherein the at least one of a country designation portion, a quality of service, a class of service portion, and a service type portion is derived from the information; and
transmitting, using the instructions executed by the processor, the request appended with the information to a routing device, the information used for instructing the routing device to select one of the destination network domains according to the information appended with the request.

9. The differentiated routing method of claim 8, wherein the information comprises geographical information, the geographical information used by the routing device to select the destination network domain according to a geographical region where the calling party terminal resides by processing a phone number of the calling party terminal.

10. The differentiated routing method of claim 8, wherein the information comprises one or more performance parameters, the one or more performance parameters used by the routing device to select the destination network domain according to the one or more performance parameters for the communication service.

11. The differentiated routing method of claim 10, further comprising:
identifying a service level agreement (SLA) associated with the calling party terminal;
accessing a database store to obtain the one or more performance parameters included in the SLA.

12. The differentiated routing method of claim 8, wherein the instructions are further executed to identify the ingress gateway that issued the request, determine a trunk of a particular customer that is dedicated for use with the ingress gateway, identify a service level agreement (SLA) that is associated with the trunk, access a database store to obtain the one or more performance parameters included in the SLA, and include the one or more performance parameters of the SLA in the tag.

13. The differentiated routing method of claim 8, wherein the tag comprises a session initiation protocol (SIP) domain portion of a SIP message.

14. The differentiated routing method of claim 13, wherein the information comprises type of service information, the type of service information used by the routing device to select one of the destination network domains that provides a type of service associated with the type of service information.

15. Code implemented in a non-transitory, computer readable medium that when executed by a processor, is operable to perform at least the following:
receiving a request from an ingress gateway for establishing a communication service for a calling party terminal, wherein the ingress gateway provides communication services for the calling party terminal in a native network domain, the native network domain comprising a plurality of egress gateways that route the communication services to a corresponding plurality of destination network domains;
obtaining information associated with the calling party terminal, the information used for applying at least one of a routing decision and policy decision to the communication service, and further wherein the information is indicative of at least one of a country designation portion, a quality of service, a class of service portion, and a service type portion;
appending a tag, wherein the tag includes the at least one of a country designation portion, a quality of service, a class of service portion, and a service type portion, wherein the at least one of a country designation portion, a quality of service, a class of service portion, and a service type portion is derived from the information to the request; and
transmitting the request appended with the information to a routing device, the information used for instructing the routing device to select one of the destination network domains according to the information appended with the request.

16. The code of claim 15, wherein the information comprises geographical information, the geographical information used by the routing device to select the destination network domain according to a geographical region where the calling party terminal resides by processing a phone number of the calling party terminal.

17. The code of claim 15, wherein the information comprises one or more performance parameters, the one or more performance parameters used by the routing device to select the destination network domain according to the one or more performance parameters for the communication service.

18. The code of claim 17, further operable to perform:
identify a service level agreement (SLA) associated with the calling party terminal;
access a database store to obtain the one or more performance parameters included in the SLA.

19. The code of claim 15, wherein the tag comprises a session initiation protocol (SIP) domain portion of a SIP message.

20. The code of claim 15, wherein the information comprises type of service information, the code further operable to perform appending the type of service information to the tag, the type of service information used by the routing device to select one of the destination network domains that provides a type of service associated with the type of service information.

21. A differentiated routing system comprising:
a computing system comprising at least one processor and at least one memory to store instructions that are executed by the at least one processor to:
receive a request from a gateway router for establishing a communication service for a subscriber terminal, the request including unique identifying information associated with the subscriber terminal, wherein the unique identifying information is indicative of at least one of a country designation portion, a quality of service, a class of service portion, and a service type portion;
forward the request to a core routing engine, the core routing engine storing subscriber lease agreement information associated with the subscriber terminal;
receive the service level agreement from the core routing engine; and
include a tag in a response to the request, wherein the tag includes the at least one of a country designation portion, a quality of service, a class of service portion, and a service type portion, wherein the at least one of a country designation portion, a quality of service, a class of service portion, and a service type portion is derived from at least one element, the tag instructing the gateway router to establish the communication service.

22. The differentiated routing system of claim 21, wherein the instructions are further executed to append the at least one element of the service level agreement to a sip message, the sip message instructing the gateway router to establish the communication service using the at least one element of the service level agreement.

23. The differentiated routing system of claim 21, wherein the unique identifying information comprises a phone number associated with the subscriber terminal.

24. The differentiated routing system of claim 21, wherein the at least one element of the service level agreement comprises information associated with a native country of the subscriber terminal.

25. The differentiated routing system of claim 21, wherein the at least one element of the service level agreement comprises information associated with a class of service level or a quality of service level to be associated with the subscriber terminal.

26. The differentiated routing system of claim 21, wherein the at least one element of the service level agreement comprises information associated with a product to be used by the subscriber terminal.

* * * * *